United States Patent
Revol et al.

(10) Patent No.: US 9,274,220 B2
(45) Date of Patent: Mar. 1, 2016

(54) METHOD FOR LOCATING AIRCRAFT WHICH IS INDEPENDENT OF ANY SATELLITE NAVIGATION SYSTEM

(75) Inventors: Marc Revol, Upic (FR); Pierre Bouniol, Saint Hilaire du Rosier (FR); Christophe Picco, Toulouse (FR)

(73) Assignee: Thales, Courbevoie (FR)

( * ) Notice: Subject to any disclaimer, the term of this patent is extended or adjusted under 35 U.S.C. 154(b) by 963 days.

(21) Appl. No.: 13/444,181

(22) Filed: Apr. 11, 2012

(65) Prior Publication Data
US 2013/0120183 A1      May 16, 2013

(30) Foreign Application Priority Data

Apr. 14, 2011 (FR) ..................................... 11 01163

(51) Int. Cl.
G01S 13/08    (2006.01)
G01S 13/91    (2006.01)
G01S 5/02     (2010.01)
G01S 13/78    (2006.01)

(52) U.S. Cl.
CPC ................. G01S 13/91 (2013.01); G01S 5/021 (2013.01); G01S 13/781 (2013.01)

(58) Field of Classification Search
CPC ... G01S 13/785; G01S 13/765; G01S 13/876; G01S 13/878; G01S 5/10
USPC ......................................................... 342/47
See application file for complete search history.

(56) References Cited

U.S. PATENT DOCUMENTS 3,691,560 A *  9/1972  Hammack ...................... 342/387
6,094,169 A    7/2000  Smith et al.
(Continued)

FOREIGN PATENT DOCUMENTS

WO       2011009109 A2    1/2011

OTHER PUBLICATIONS

Y. Eric Yang, J. Baldwin, and A. Smith; Multilateration Tracking and Synchronization Over Wide Areas; Proceedings of the 2002 IEEE Radar Conference (IEEE Cat. No. 02CH37322); Jan. 1, 2002; pp. 419-424.

(Continued)

*Primary Examiner* — Timothy A Brainard
(74) *Attorney, Agent, or Firm* — Michael J. Donohue; Davis Wright Tremaine LLP

(57) ABSTRACT

The present invention relates to a method for locating an aircraft ($A_k$), the said aircraft ($A_k$) being equipped with at least one device for sending and receiving ADS-B signals, a set of ADS-B communication beacons being deployed on the ground, the position of each of the said ADS-B beacons being known, the said locating method comprising:
 a step of calibrating the time biases of the ADS-B beacons with a view to correcting the synchronization discrepancies when sending, by means of the calculation of the time discrepancy existing between the ADS-B beacons (B1, B2) upon reception of downgoing ADS-B signals sent by a set of aircraft equipped with at least one device for sending ADS-B signals;
 a step of calculating the pseudo-distances between the said aircraft ($A_k$) and the said ADS-B beacons deployed on the ground, on the basis of the upgoing ADS-B signals.

21 Claims, 1 Drawing Sheet

(56) References Cited

U.S. PATENT DOCUMENTS

2009/0273519 A1    11/2009   Baker et al.
2012/0162014 A1*    6/2012   Wu ......................... G01S 5/10
                                                        342/387

OTHER PUBLICATIONS

Institute National De La Propriete Industrielle; Preliminary Search Report; Nov. 17, 2011; Paris, France.

* cited by examiner

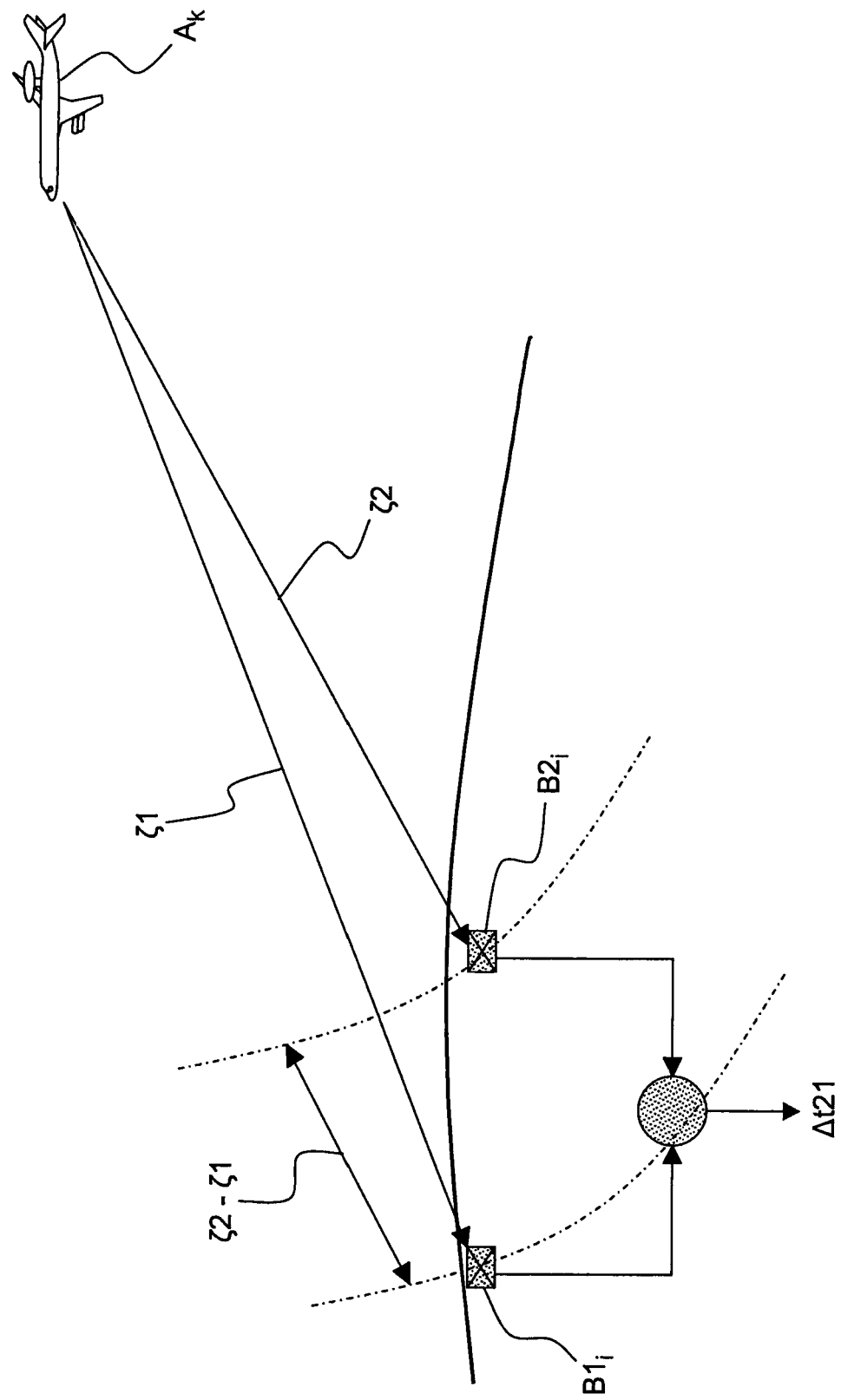

METHOD FOR LOCATING AIRCRAFT WHICH IS INDEPENDENT OF ANY SATELLITE NAVIGATION SYSTEM

The present invention relates to a method of navigation for aeronautics which is an alternative to satellite navigation systems of civil GNSS (Global Navigation Satellite System) type and based on existing radio-navigation infrastructures, making it possible to ensure both secure location and secure navigation for a set of aircraft.

Secure navigation for trajectories of RNAV (aRea NAVigation) or RNP (Required Navigation Performance) type relies essentially on the availability of the GNSS navigation signals broadcast by constellations of satellites such as GPS, Galileo, etc. associated according to requirements with their regional and local extensions, notably so as to bolster the integrity of the various approach phases.

The temporary unavailability of a constellation of satellites can immobilize civil aeronautical navigation as a whole. The proposed solution seeks to be an alternative to this major problem by allowing reconfiguration of the onboard means of communication and location—without GNSS means—so as to establish secure navigation equivalent to GNSS navigation, even in the case of unavailability of any signal arising from a GNSS.

Currently, in the absence of availability of location data arising from a GNSS, first-level aircraft employ equipment allowing them to calculate a non-secure location in an autonomous manner. Conventionally, the whole civil aircraft fleet is equipped with this known equipment. In particular this entails radio-navigation equipment for ground distance measurement ground DME (Distance Measuring Equipment) or inertial reference systems (IRS).

This onboard equipment, DME, IRS, allows aircraft to calculate their first-level location. Reference publications describe known systems such as these: G01S13/78D: "Method for automatically selecting radionavigation beacons" and G01C21/16A: "Hybrid INS/GNSS system with integrity monitoring and method for integrity monitoring".

According to the prior art, when GNSS data are available, it is also known to use means for hybridizing the data arising from the GNSS with the location data arising from the DME/IRS onboard equipment so as to calculate a secure position of the aircraft.

The technical problem solved by the invention therefore relates to the provision of a location of aircraft, in the absence of availability of GNSS signals.

Thus, the subject of the invention is a method for locating a set of aircraft, the said set of aircraft being equipped with at least one onboard system for calculating distance and location and a device for sending and receiving Automatic Dependent Surveillance-Broadcast (ADS-B) signals, a set of ADS-B communication beacons being deployed on the ground, the position of each of the said ADS-B beacons being known; the method according to the invention is characterized by the fact that it comprises:

- a step of calibrating the time biases of the ADS-B beacons by means of the calculation of the time discrepancy existing between the ADS-B beacons upon reception of ADS-B signals sent by the said aircraft;
- a step of calculating the pseudo-distances between the said aircraft and the said ADS-B beacons taking into account the calibrated time biases between beacons;
- a step of calculating the location of the aircraft on the basis of the said pseudo-distances.

Advantageously, the aircraft can furthermore comprise at least one item of distance measuring equipment (DME) for locating the aircraft, the method moreover comprising a step of Kalman filter based hybridization of the location information arising from the measurements of pseudo-distances between the said aircraft and the said ADS-B ground beacons and of the location information arising from the distance measuring equipment (DME).

Advantageously, the method according to the invention can furthermore comprise an inertial reference system (IRS) for locating the aircraft and the method comprises a step of Kalman filter based hybridization of the location information arising from the measurements of pseudo-distances between the said aircraft and the said ADS-B ground beacons and of the location information arising from the inertial reference system (IRS).

Advantageously, the method according to the invention can furthermore comprise a means for calculating protection radius making it possible to ensure the integrity of the calculated location solution, by means of the calculation of the maximum of separation between two calculated hybrid location solutions, by combining the measurements arising from the inertial reference system (IRS) and from the onboard system for calculating distance and location (DME) on the one hand, allowing a calculation of filtered position, and by combining measurements arising from the inertial reference system (IRS) and from the ADS-B beacons on the other hand, allowing a calculation of filtered pseudo-distances.

Advantageously, the method according to the invention can furthermore comprise an inertial reference system (IRS) for locating the aircraft and the method comprises a step of Kalman filter based hybridization of the location information arising from the measurements of pseudo-distances between the said aircraft and the said ADS-B beacons deployed on the ground from the location information arising from the distance measuring equipment (DME), and from the location information arising from the inertial reference system (IRS).

Advantageously, the said set of aircraft can comprise first-level aircraft visible from the ADS-B beacons deployed on the ground, the method according to the invention being applied for each of the said first-level aircraft.

Advantageously, the first-level aircraft then ensure the function of ADS-B beacons for the aircraft as a supplement to the ADS-B beacons deployed on the ground.

Other characteristics and advantages of the invention will become apparent with the aid of the description which follows, and with regard to the appended drawing which represents a basic diagram of the method according to the invention.

The proposed solution consists in establishing the location of an aircraft $A_k$ by using the standard navigation means available aboard first-level civil aeronautics aircraft and the existing communication ground beacons, namely in particular ADS-B (Automatic Dependent Surveillance-Broadcast) beacons $\{B_i\}$, deployed on the ground, and adapted for ensuring the function of multi-reference distance measurement locating devices.

As represented in FIG. 1, the locating method according to the invention consists of an onboard method for locating the aircraft $A_k$ of "snapshot" type, based on the measurements of pseudo-distances estimated on the upgoing signals sent from the existing network of ADS-B ground beacons, the said beacons being of known position. No additional deployment of beacons is made necessary by the present invention.

Firstly, the method according to the invention comprises a step of estimating the biases of synchronization of the time bases between ADS-B beacons representing the main difficulty in the implementation of such a principle. Accordingly, the present invention proposes a scheme for calibrating the time biases, based on compensating the measurements of the reception time discrepancies existing between the pairs ($B1_i$, $B2_i$) of ADS-B beacons deployed on the ground, through the theoretical propagation time discrepancies calculated on the basis of the known positions of the ground beacons and of the estimated navigation positions of the various aircraft, transmitted via the ADS-B.

The discrepancy in reception time of the ADS-B signals, between the beacons ($B1_i$, $B2_i$) disposed on the ground, and sent by each first-level aircraft $A_k$ visible from the said ADS-B beacons ($B1_i$, $B2_i$), may be written:

$$\Delta t21_{ik} = \Delta \tau 21_{ik} + b21_i$$

with:
  k is the index of aircraft $A_k$
  i is the index of the pair of ADS-B ground beacons
  $\Delta \tau 21_{ik}$ represents the discrepancy in theoretical propagation time between aircraft k and each of the ADS-B ground beacons $B1_i$, $B2_i$; the theoretical distance is calculated by virtue of the a priori knowledge of the position of the ADS-B ground stations, and by virtue of the location information for aircraft $A_k$, calculated by its DME and IRS autonomous navigation means and distributed through the ADS-B message of the downlink.

The time biases $b21_i$ existing between the ADS-B beacons ($B1_i$, $B2_i$) are estimated permanently on the basis of the measurements of the time discrepancies $\Delta t21_{ik}$ and positions, transmitted by ADS-B, of the N first-level aircraft $\{A_k\}$ passing within visibility:

$$\hat{b}21_i = \frac{1}{N} \cdot \sum_{k=1}^{N} (\Delta t21_{ik} - \Delta \tau 21_{ik})$$

These estimations averaged over the set of aircraft within visibility, simultaneous or successive over time, make it possible to benefit from the geometric configurations that are favourable to time discrepancy estimation and to aggregate them according to the angles of incidence of the downgoing signals on each of the pairs of beacons.

This device also requires that the ADS-B ground beacons be linked to one another, at least pairwise, so as to calculate the discrepancies between the arrival dates. The major advantage with respect to a conventional reception time discrepancy measurement system is that the solution does not require any precise synchronization of the time bases of the ADS-B beacons, which is required to within a few nano-seconds according to the prior art, which would require continuous maintenance of the means for calibrating the biases of propagation of the time signals specific for the ground network.

These biases $b21_i$, evolving slowly with time and temperature and being identical from one aircraft $A_k$ to another, are averaged over several minutes so as to achieve optimal precision.

The time biases existing between the ADS-B beacons deployed on the ground being calculated, the method according to the invention provides, in a second step, for the calculation of the pseudo-distances between the aircraft $A_k$ and each ADS-B beacon deployed on the ground, visible from the aircraft $A_k$. According to a preferred mode of implementation of the invention, the distance measurement per sighting axis for each ADS-B beacon is done by adaptive filtering of the local-code sequence, corresponding to a code for identifying the ADS-B beacons deployed on the ground, placed at the start of each 1-second frame of the ADS-B messages sent. The precision of the distance measurement then depends on the quality of the correlation function ensuing from this identification code. The locating method according to the invention, utilizing the ADS-B beacons deployed on the ground, thus uses the ADS-B signals, transmitted continuously, to estimate the pseudo-distances between the ADS-B receiver onboard the aircraft $A_k$ and each of the ADS-B ground beacons.

In a third step, the position of aircraft $A_k$ is calculated conventionally, for example by least-squares solution procedures, on the basis of the pseudo-distance measurements performed in the second step and of the matrix of the geometric sighting axes, the positions of the ADS-B beacons being known, and under the assumption that the said ADS-B beacons are mutually synchronized, or at least that the time biases have been correctly calculated during the first step of the method and transmitted to the aircraft via the upgoing ADS-B signal.

According to a second embodiment, the invention proposes an integrated hybridization scheme allowing joint calculation of the position and, optionally, of the protection radius, on the basis of the set of references available, arising from an inertial reference system (IRS), of an onboard system for calculating distance and location (DME for Distance Measuring Equipment) and of the method, already described, according to the invention utilizing the available ADS-B beacons.

One of the benefits of this approach is to allow the comparison of location solutions obtained through two independent principles of measurement, and thus to ensure the integrity of the solution in a given protection radius, calculated aboard the aircraft. Furthermore, the use of existing onboard reference means facilitates the deployment of the method as well as its certification.

The Kalman filter based hybridization carries out a long-term filtering of the instantaneous measurements of ADS-B pseudo-distances, calculated by way of the method according to the invention, and of the displacement and position measurements obtained by virtue of the other onboard equipment, IRS and DME. This hybridization relies on the estimation of inertial speed so as to improve the precision of the filtered pseudo-distances and to reduce the optionally calculated protection radius. The method according to the invention can indeed provide for a step of calculating the protection radius obtained by estimating the maximum of separation between two calculated location solutions, by combining the measurements arising from the IRS and from the DME on the one hand, allowing a calculation of filtered position, and by combining measurements arising from the IRS and from the ADS-B beacons on the other hand, allowing a calculation of filtered pseudo-distances.

An autonomous calculation of the hybrid protection radius for the IRS+ADS-B position can also be carried out, preferably according to the approach of Breiner, by calculating the maximum of separation between the N solutions with N−1 sighting axes of the ADS-B beacons.

According to an additional embodiment, the invention proposes to use the first-level aircraft $A_k$ as new ADS-B distance references, once their location has been secured. This new distance reference is then usable by the aircraft that are not equipped with any IRS inertial system or distance measuring equipment DME, for their own location. To this end, first-level aeroplanes are equipped with a continuous ADS-B communication channel, equivalent to that of the ADS-B beacons deployed on the ground. These aircraft $A_k$ then ensure the function of ADS-B beacons for second-level aeroplanes, as a supplement to the ADS-B beacons deployed on the ground. By applying the first, second and third steps of the method according to the invention, the second-level aircraft calculate their location with the aid of the first-level aircraft $A_k$ serving as ADS-B beacons. For these second-level aircraft, not equipped with autonomous navigation means (IRS, DME), a location calculation is possible on board, even in the absence of GNSS signals.

To summarize, the invention presents the advantage of allowing a set of aircraft to calculate their location by onboard means, even in the case of unavailability of any GNSS signal, and even for aircraft not equipped with any onboard DME distance measuring equipment or IRS inertial system.

The invention claimed is:

1. Method for locating a set of aircraft, each of the said set of aircraft being equipped with at least one onboard system for calculating distance and location using Distance Measuring Equipment (DME) and/or Inertial Reference Systems (IRS) and a device for sending and receiving Automatic Dependent Surveillance-Broadcast (ADS-B) signals, a set of ADS-B communication beacons being deployed on the ground, the position of each of the said ADS-B beacons being known, characterized in that it comprises:
- a step of permanently calibrating time discrepancy biases between ADS-B beacons, estimated over a historical log of passages within range of the beacons of the said set of aircraft, by means of calculation of the mean discrepancy in propagation time between beacons of downgoing ADS-B signals sent by the said set of aircraft and corrected for a theoretical propagation delay, the said theoretical propagation delay being estimated on the basis of the a priori knowledge of the ground positions of the ADS-B beacons and of dynamic positions of the said set of aircraft calculated aboard by the onboard DME and/or IRS and transmitted via the messages of the said downgoing ADS-B signals;
- a step of calculating pseudo-distances between any aircraft within range of the beacons and the set of the said ADS-B beacons taking into account the calibrated time biases between beacons, the distance measurement on a sighting axis of each ADS-B beacon is done by adaptive filtering of a local-code sequence, corresponding to a code for identifying the ADS-B beacons deployed on the ground and placed at the start of each 1-second frame of the ADS-B messages sent;
- a step of calculating the location of the said set of aircraft on the basis of the said pseudo-distances and of a matrix of geometric sighting axes, the said location being carried out on the basis of a least-squares solution procedure equivalent to the instantaneous solution procedure for a GPS position, but by using only upgoing reference signals sent by the ground beacons.

2. Method for locating a set of aircraft, the said set of aircraft comprising first-level aircraft within range of the ADS-B beacons deployed on the ground, the method according to claim 1 being applied for each of the said first-level aircraft.

3. Method for locating a set of aircraft in which first-level aircraft ensure the function of ADS-B beacons for others of the set of aircraft as a supplement to the ADS-B beacons deployed on the ground, the method according to claim 2 being applied for each of the said aircraft of the set of aircraft.

4. Method according to claim 1, characterized in that it furthermore comprises a protection radius calculation step making it possible to ensure the integrity of the calculated location solution, by means of the calculation of the maximum of separation between two calculated hybrid location solutions, by combining the measurements arising from the IRS and from the onboard DME on the one hand, allowing a calculation of filtered position, and by combining measurements arising from the IRS and from the ADS-B beacons on the other hand, allowing a calculation of filtered pseudo-distances.

5. Method for locating a set of aircraft, the said set of aircraft comprising first-level aircraft within range of the ADS-B beacons deployed on the ground, the method according to claim 4 being applied for each of the said first-level aircraft.

6. Method for locating a set of aircraft in which first-level aircraft ensure the function of ADS-B beacons for others of the set of aircraft as a supplement to the ADS-B beacons deployed on the ground, the method according to claim 5 being applied for each of the said aircraft of the set of aircraft.

7. Method according to claim 1, comprising a step of Kalman filter based hybridization of the location information arising from the measurements of pseudo-distances between the said set of aircraft and the said ADS-B ground beacons and of the location information arising from the DME for locating the said set of aircraft.

8. Method for locating a set of aircraft, the said set of aircraft comprising first-level aircraft within range of the ADS-B beacons deployed on the ground, the method according to claim 7 being applied for each of the said first-level aircraft.

9. Method for locating a set of aircraft in which first-level aircraft ensure the function of ADS-B beacons for others the set of aircraft as a supplement to the ADS-B beacons deployed on the ground, the method according to claim 8 being applied for each of the said aircraft of the set of aircraft.

10. Method according to claim 7, comprising a step of Kalman filter based hybridization of the location information arising from the measurements of pseudo-distances between the said set of aircraft and the said ADS-B beacons deployed on the ground, of the location information arising from the DME, and of the location information arising from the IRS.

11. Method for locating a set of aircraft, the said set of aircraft comprising first-level aircraft within range of the ADS-B beacons deployed on the ground, the method according to claim 10 being applied for each of the said first-level aircraft.

12. Method for locating a set of aircraft in which first-level aircraft ensure the function of ADS-B beacons for others the set of aircraft as a supplement to the ADS-B beacons deployed on the ground, the method according to claim 11 being applied for each of the said aircraft of the set of aircraft.

13. Method according to claim 7, characterized in that it furthermore comprises a protection radius calculation step making it possible to ensure the integrity of the calculated location solution, by means of the calculation of the maximum of separation between two calculated hybrid location solutions, by combining the measurements arising from the IRS and from the onboard DME on the one hand, allowing a calculation of filtered position, and by combining measurements arising from the IRS and from the ADS-B beacons on the other hand, allowing a calculation of filtered pseudo-distances.

14. Method for locating a set of aircraft, the said set of aircraft comprising first-level aircraft within range of the ADS-B beacons deployed on the ground, the method according to claim 13 being applied for each of the said first-level aircraft.

15. Method for locating an aircraft in which first-level aircraft ensure the function of ADS-B beacons for the aircraft as a supplement to the ADS-B beacons deployed on the ground, the method according to claim 14 being applied for each of the said aircraft of the set of aircraft.

16. Method according to claim 1, comprising a step of Kalman filter based hybridization of the location information arising from the measurements of pseudo-distances between the said set of aircraft and the said ADS-B ground beacons and of the location information arising from the IRS for locating the said set of aircraft.

17. Method for locating a set of aircraft, the said set of aircraft comprising first-level aircraft within range of the ADS-B beacons deployed on the ground, the method according to claim 16 being applied for each of the said first-level aircraft.

18. Method for locating an aircraft in which first-level aircraft ensure the function of ADS-B beacons for others of the set of aircraft as a supplement to the ADS-B beacons deployed on the ground, the method according to claim 17 being applied for each of the said aircraft of the set of aircraft.

19. Method according to claim 16, characterized in that it furthermore comprises a protection radius calculation step making it possible to ensure the integrity of the calculated location solution, by means of the calculation of the maximum of separation between two calculated hybrid location solutions, by combining the measurements arising from the IRS and from the onboard DME on the one hand, allowing a calculation of filtered position, and by combining measurements arising from the IRS and from the ADS-B beacons on the other hand, allowing a calculation of filtered pseudo-distances.

20. Method for locating a set of aircraft, the said set of aircraft comprising first-level aircraft within range of the ADS-B beacons deployed on the ground, the method according to claim 19 being applied for each of the said first-level aircraft.

21. Method for locating an aircraft in which first-level aircraft ensure the function of ADS-B beacons for others of the set of aircraft as a supplement to the ADS-B beacons deployed on the ground, the method according to claim 20 being applied for each of the said aircraft of the set of aircraft.

* * * * *